United States Patent [19]

Sato et al.

[11] Patent Number: 5,181,838

[45] Date of Patent: Jan. 26, 1993

[54] VEHICLE WASHER PUMP

[75] Inventors: Toshihiro Sato, Toyohashi; Masaaki Kiyama; Yasuhiro Harita, both of Kosai; Osamu Ozone, Toyohashi, all of Japan

[73] Assignee: Asmo Co., Ltd., Shizuoka, Japan

[21] Appl. No.: 706,585

[22] Filed: May 28, 1991

[30] Foreign Application Priority Data

Jun. 4, 1990 [JP] Japan .............................. 2-59343[U]
Dec. 27, 1990 [JP] Japan .............................. 2-414683

[51] Int. Cl.⁵ .......................................... F04B 35/00
[52] U.S. Cl. .................................. 417/360; 417/363; 417/423.14; 417/423.15
[58] Field of Search ............. 417/360, 361, 363, 366, 417/423.14, 423.15

[56] References Cited

U.S. PATENT DOCUMENTS

| | | | |
|---|---|---|---|
| 3,982,856 | 9/1976 | Hehl | 417/360 |
| 4,177,021 | 12/1979 | Niedermeyer | 417/423.15 |
| 4,309,155 | 1/1982 | Heinz et al. | 417/360 |
| 4,768,925 | 9/1988 | Geupel | 417/363 |

FOREIGN PATENT DOCUMENTS

| | | |
|---|---|---|
| 0284662 | 12/1987 | European Pat. Off. |
| 2901456 | 12/1980 | Fed. Rep. of Germany |
| 48-30906 | 9/1973 | Japan |
| 64-368 | 1/1989 | Japan |
| 1161868 | 8/1969 | United Kingdom |
| 2027283A | 2/1980 | United Kingdom |

Primary Examiner—Richard A. Bertsch
Assistant Examiner—Charles G. Freay
Attorney, Agent, or Firm—Oliff & Berridge

[57] ABSTRACT

The present invention provides a vehicle window washing system having a washer pump which includes a cylindrical housing, a pump section formed in the housing, a motor section formed in the housing, an outlet formed in the housing to extend outwardly therefrom, and a flow passage connecting the outlet with the pump section. The washer pump is fixedly held relative to a washing liquid tank under such a condition that at least the pump section is inserted into the washing liquid tank through an opening therein.

16 Claims, 15 Drawing Sheets

VEHICLE WASHER PUMP

BACKGROUND OF THE INVENTION

1. Field of the Invention

The present invention relates to improvements in such a washer pump that is used to supply a liquid for washing windows in a vehicle.

2. Description of the Related Art

FIG. 17 shows part of a vehicle window washing system disclosed in Japanese Utility Model Publication No. 48-30906: FIG. 17A is a front view of the washing system and FIG. 17B is a side view of the same system, partially broken.

The vehicle window washing system comprises a tank 1 including a side recess 3 which is formed in the tank 1 at one side for receiving a pump part 2 tightly therein. The outer opposite edges of the side recess 3 include projections 4 for preventing the pump part 4 from being removed accidentally from the side recess 3. The pump part 4 includes an inlet pipe 8 which communicates with the interior of the tank 1 through a bushing 7.

Such an arrangement has the following problems:

(1) Since the tank 1 has the side recess 3 as well as the projections 4 formed therein at the outer edges, the tank 1 will be of a complicated configuration. The side recess 3 for receiving the pump part 2 must be formed with an increased accuracy. It is thus difficult to form the tank 1, leading to a reduced efficiency of production and an increased manufacturing cost.

Since the outer edge projections 4 are of a so-called undercut configuration, a molded tank must be removed forcedly out of a mold used. This causes the product to be deformed. It is thus difficult to form the tank 1 with an increased dimensional accuracy.

(2) In order to form the side recess 3 and outer edge projections 4 with a desired dimensional accuracy, the thickness of a material forming the tank 1 is required to be increased up to a predetermined level. This increases the tank 1 in weight.

(3) Since the pump part 2 is located closely adjacent the tank 1, any vibration produced when a motor in the pump part 2 is actuated will be transmitted to the tank 1 to generate a noise.

FIG. 18 is a perspective view of another vehicle window washing system disclosed in Japanese Utility Model Publication No. 64-368. Such a washing system comprises a tank 1 for receiving a washing liquid, a lid member 1b for closing the liquid inlet port 1a in the tank 1, and a pump unit 2 mounted on the lid member 1b at the bottom thereof and including an impeller 2a, a motor 2b and an inlet port 2c. Thus, the lid member 1b defines an integral washer unit with the pump unit 2.

In such an arrangement, it is not required to form any pump receiving recess 3 in the tank 1 as in the aforementioned prior art, since the pump unit 2 is positioned within the tank 1 when the lid member 1b is mounted in the liquid inlet port 1a of the tank 1. Therefore, this window washing system does not possess the three problems as described hereinbefore. However, it raises new problems as follows:

(1) Since the pump unit 2 is mounted on the lid 1b, the position of the pump unit 2 mounted in the window washing system is limited to a range in which the lid member 1b can be mounted on the tank 1. Thus, the pump unit 2 is limited in mounting position and configuration, leading to restriction of the range of permissibility in design.

More particularly, the pump unit 2 must be designed depending on the height h of the tank 1 since it is normally requested that the lid member 1b is placed on the top of the tank 1 and also the inlet port 2c of the pump unit 2 is formed near the bottom face of the tank 1. Therefore, a pump unit designed for a particular tank having a height cannot be applied to another tank having a different height. The window washing system is very limited in application.

Recently, since many different liquid tanks of various different configurations and/or types are being used in various different types of motocars, the above problem becomes very large obstruction in practice.

(2) Since an outlet hose P and a wiring Q to the motor 2b are connected with the lid 1b for the tank 1, the hose P and wiring Q must be slackened sufficiently to move when the lid 1b is mounted on or removed from the tank 1. This also provides a restriction in design.

SUMMARY OF THE INVENTION

It is therefor a primary object of the present invention to provide a vehicle window washing system which can facilitate to mount a washer pump in the system and which can be assembled with an improved efficiency.

Another object of the present invention is to provide a vehicle window washing system which can be applied to all washing liquid receiving tanks having different configurations.

Still another object is to provide a vehicle window washing system which can effectively suppress any noise due to vibration produced when the washer pump is actuated.

To this end, the present invention provides a vehicle window washing system comprising a tank for receiving a washing liquid, said tank including an liquid inlet port formed therein, and a washer pump mounted in the tank, said system being characterized by that said tank includes an opening formed in part of the wall thereof and that said washer pump comprises a cylindrical housing, pump means disposed within said housing and including an inlet port and an impeller, motor means located within said housing and adapted to rotatably drive said impeller, outlet means formed in said housing to extend outwardly from said housing, and passage means for connecting said outlet means with said pump means, at least said pump means in said washer pump being inserted into the interior of said tank through said opening therein and said washer pump being fixedly mounted on said tank such that the outlet means is positioned outside said tank.

Such an arrangement provides the following advantages:

(1) The washer pump can be completely mounted on the washer tank only by inserting the washer pump into the interior of the washer tank through the opening formed therein and fixedly mounting the washer pump on the washer tank with or without any suitable fastening means such as grommet. Therefore, the number of parts and assembling steps can be reduced. As a result, the washer pump can be easily mounted on the washing liquid tank more efficiently, leading to high reduction in manufacturing cost.

(2) Since the washing liquid tank includes only an opening formed therein without any particular molding step, the tank can be of a simplified configuration with reduced weight and with improved efficiency of molding. This also results in facilitation of control in dimensional accuracy.

(3) Since the washer pump is only mounted in the opening formed in the washing liquid tank, there is no limitation to the mounting of the washer pump. Therefore, the washer pump can be suitably mounted on the tank at any position depending on the configuration and position of the tank on the vehicle. The vehicle window washing system can be designed more easily and simply.

(4) Since the washing liquid is discharged by the pump means from the tank through the outlet via the flow passage, the flow of the washing liquid discharged from the tank can be directed to any direction of discharge only by setting the orientation of the outlet means irrespective of the direction of rotation in the impeller of the pump means. The design of piping can be made easily and simply.

In this regard, it is desirable that the washer pump is fixedly mounted on the tank under such a condition that the pump means and at least part of the motor means are inserted into the interior of the tank.

(5) Since most of the washer pump body is immersed in the washing liquid within the tank, the vibration produced when the motor means in the washer pump is actuated can be absorbed by the washing liquid without transmission to the tank body, leading to reduction of any noise due to the vibration.

(6) Furthermore, the washer pump can be cooled effectively by the washing liquid. This prevents the motor from being overheated, and assures a stability in operation for a prolonged period of time.

BRIEF DESCRIPTION OF THE DRAWINGS

FIG. 16 shows a modification of the washer pump: FIG. 16A is a longitudinal cross-section of the washer pump and FIG. 16B is a cross-section of the same washer pump, taken along a line B—B in FIG. 16a.

FIG. 17 shows a vehicle window washing system constructed in accordance with the prior art.

DETAILED DESCRIPTION OF THE PREFERRED EMBODIMENTS

Figure 1:
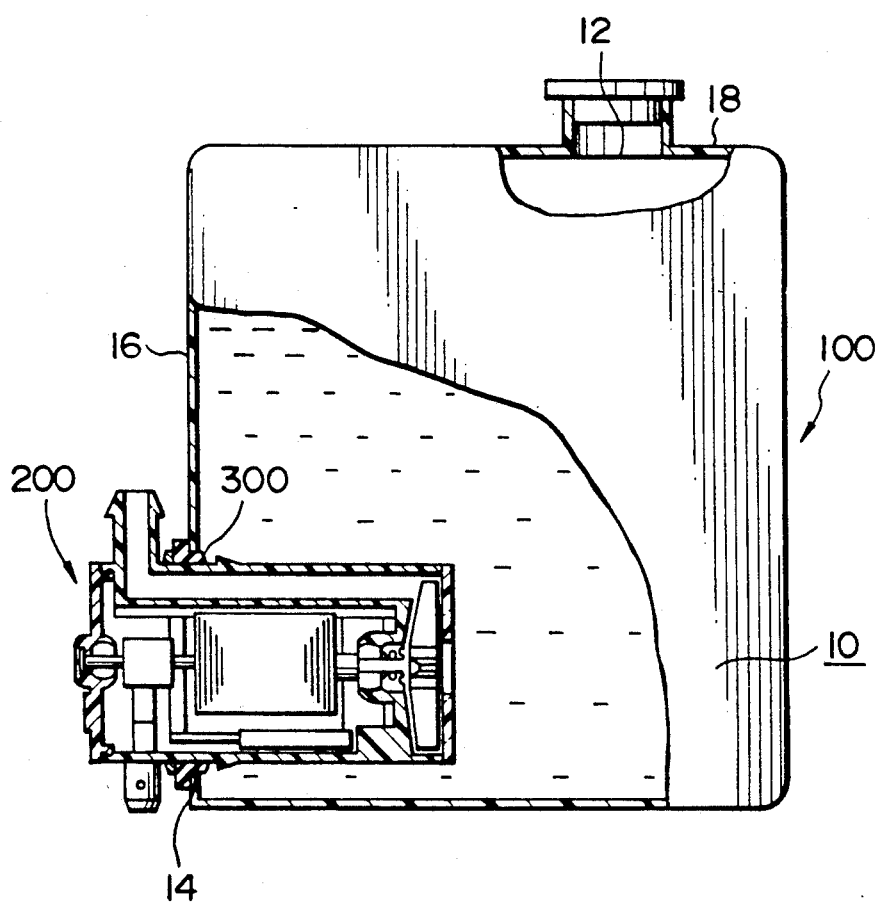
FIG. 1 is a side view, partially broken, of a first embodiment of a vehicle window washing system constructed in accordance with the present invention.

The present invention will now be described in detail with reference to some embodiments thereof which are illustrated in the drawings.

First Embodiment

Referring first to FIG. 1, there is shown the first embodiment of a vehicle window washing system constructed in accordance with the present invention which comprises a washing liquid receiving tank 100. Basically, the tank 100 comprises a vessel body 10 which includes an inlet port 12 formed in the top 18 thereof and a circular opening 14 formed in the vessel body 10 at its lower side wall 16.

A washer pump 200 is inserted into the opening 14 of the vessel body 10 and fixedly mounted therein through a grommet 300 such that all the washer pump 200 will be axially located in the interior of the washing liquid tank 100 except the outward end thereof.

Figure 2:
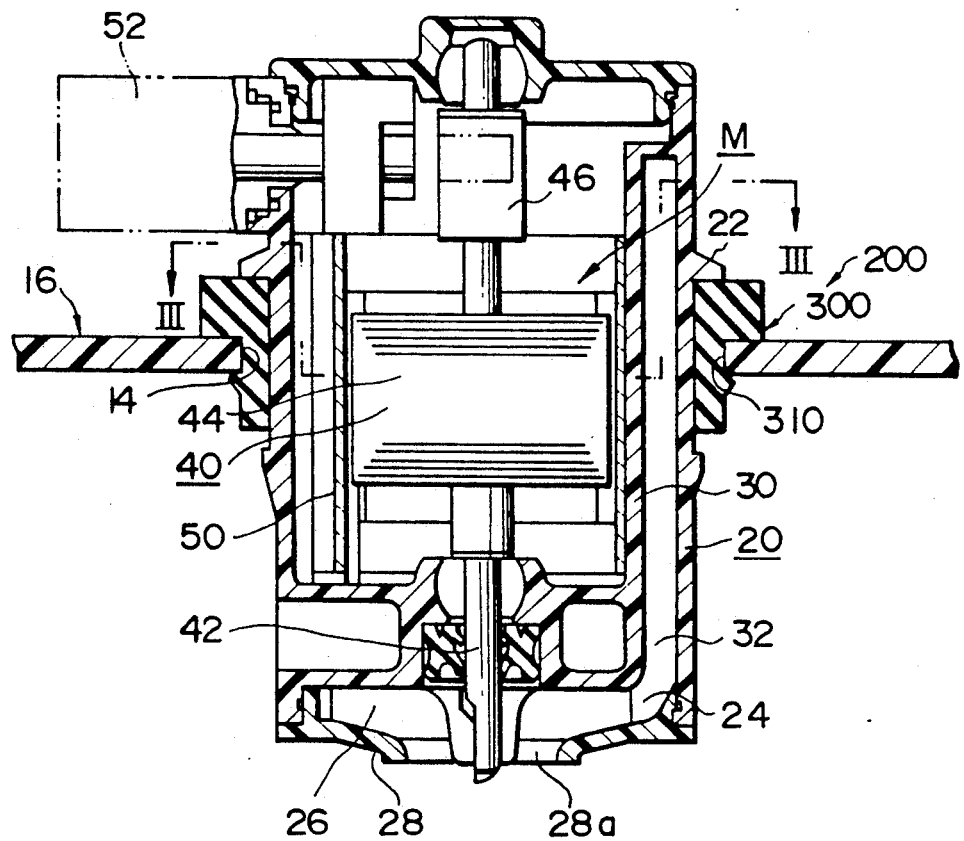
FIG. 2 is a longitudinal and enlarged cross-section of the washer pump and its mount shown in FIG. 1.
Figure 3:
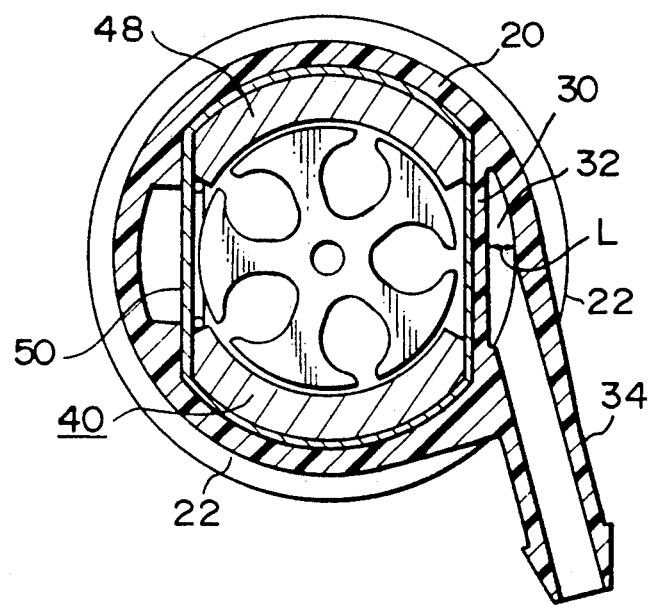
FIG. 3 is a cross-sectional view of the washer pump, taken along a line III—III in FIG. 2.

Referring next to FIGS. 2 and 3, the washer pump 200 comprises a housing 20 of plastic material having a substantially cylindrical configuration. The housing 20 includes a pump section 24 formed therein at one end (lower end) and a motor section 40 formed in the housing 20 above the pump section 24.

The pump section 24 is closed by a bottom wall 28 through which an inlet port 28a for drawing the washing liquid is formed. The pump section 24 rotatably receives an impeller 26 connected with a drive shaft 42 which is rotatably driven by the motor section 40 as will be described.

The housing 20 further includes a partition 30 formed therein, the partition being spaced apart from the inner wall of the housing 20 to form a flow passage 32 which extends parallel to the longitudinal axis of the housing 20 and communicates with the pump section 24. The top end of the flow passage 32 is connected with an outlet duct 34 which is formed in the housing 20 and extends tangentially relative to the housing 20. A circumferentially extending flange 22 is formed on the outer periphery of the housing 20 below the tangential outlet duct 34. This flange 22 functions as a stopper for holding the portion of the washer pump 200 thereabove outside the washing liquid tank 100.

The motor section 40 receives a DC motor M which comprises a rotary shaft 42, an armature 44, a commutator 46, a magnetic pole 48, a yoke 50 and so on. The housing 20 further includes a terminal 52 formed thereon to extend outwardly from the outer top wall thereof, the terminal 52 being electrically connected with the motor M. The yoke 50 also functions as a reinforcing member for the housing 20. More particularly, the yoke 50 serves effectively as a reinforcing member against a pressure acting on the washer pump 20 in the radial and inward direction since the yoke 50 is disposed at a position opposite to the opening 14 in the tank 100. Therefore, a reliable sealing property (reliability in anti-leakage) can be ensured between the grommet 300 and the washer pump 200.

Various dimensions such as length, maximum thickness, cross-sectional area and others in the flow passage 32 are selected depending on various factors such as the pressure loss in the flow passage 32, the rate of flow at the discharge port of the washer pump 200, the size of the washer pump and so on. For example, an experiment showed that the flow passage 32 is required to have the maximum thickness (shown by L in FIG. 3) equal to at least about 2 mm in order to provide a pressure loss equal to or less than 0.1 Kg/cm 2 when it is determined from the ordinary size of the washer pump 200 that the axial length of the flow passage 32 is equal to 50 mm and the discharge of the washer pump 200 is equal to about 300 cc/ten seconds.

As shown in FIG. 2, the grommet 300 is in the form of an elastomer ring having a substantially L-shape in cross-section. The elastomer ring 300 includes a groove 310 formed therein at the outer periphery of the ring and extending circumferentially therearound.

Figure 4:
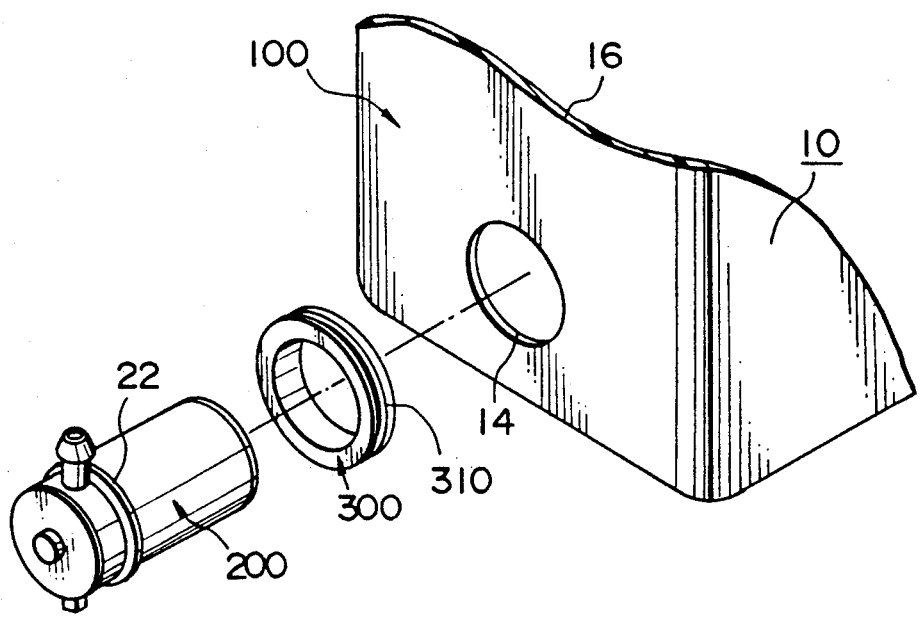
FIG. 4 is a perspective view of part of the washing system, illustrating how to mount the washer pump on the tank.

How to mount the washer pump 200 on the washing liquid tank 100 will be described with reference to FIG. 4.

The grommet 300 is first mounted in the opening 14 formed in the tank 100, with the edge of the opening 14 being fitted into the groove 310 in the outer periphery of the grommet 300. The washer pump 200 is inserted into the interior of the tank 100 forcedly through the grommet 310 until the peripheral flange 22 on the washer pump 200 engages the grommet 300. Thus, the washer pump 200 will be positioned properly relative to the tank 100. It is preferable that the washer pump 200 is inserted into the tank 100 up to such a depth that at least the armature 44 of the motor section 40 is completely positioned in the interior of the washing liquid tank 100.

Such an arrangement can provide the following advantages:

(1) Since the washer pump 200 can be mounted on the tank 100 only by inserting the washer pump 200 directly into the opening 14 of the tank 100 and holding the washer pump 200 in place through the grommet 300, the washer pump 200 can be mounted easily and simply with a reduced cost by using the reduced number of assembling steps and parts.

(2) Since the washing liquid tank 100 is only formed with a single and simple opening 14 without any complicated molding step, the tank 100 can be easily formed without any strict accuracy of dimension. Because of a simplified configuration, the tank 100 can be formed of a material having its thickness and weight smaller than the prior art.

(3) Since the washer pump 200 is only mounted in the washing liquid tank 100 at its opening 14 as described, the position of the washer pump 200 to be mounted thereon can be set at any suitable location depending on the configuration of the tank 100 and the position of the tank 100 mounted in the vehicle body. This results in increase of the degree of freedom in design and enlargement of the range of applicability.

(4) Since most of the washer pump body 200 is immersed in the washing liquid within the tank 100, any vibration produced when the motor M in the washer pump 200 is actuated can be hardly transmitted to the tank body 10 since the vibration is absorbed by the washing liquid. Thus, noise can be decreased on operation.

(5) For the same reason as described in the above item (4), the motor M of the washer pump 200 can be effectively cooled by the washing liquid in the tank 100. Thus, the washer pump 200 can operate stably for a prolonged period of time.

(6) Since the longitudinally extending flow passage 32 connects between the pump section 24 and the outlet duct 34, the direction of liquid to be discharged can be determined only by orienting the outlet duct to any desired direction, irrespective of the direction of rotation in the impeller 26. This provides an enlarged range of freedom in designing the washing liquid passageway.

(7) The motor M in the washer pump 200 can be desirably cooled also by the washing liquid flowing in the passage 32 which is located adjacent the motor M from the pump section 24 to the outlet duct 34.

Second Embodiment

Figure 5:
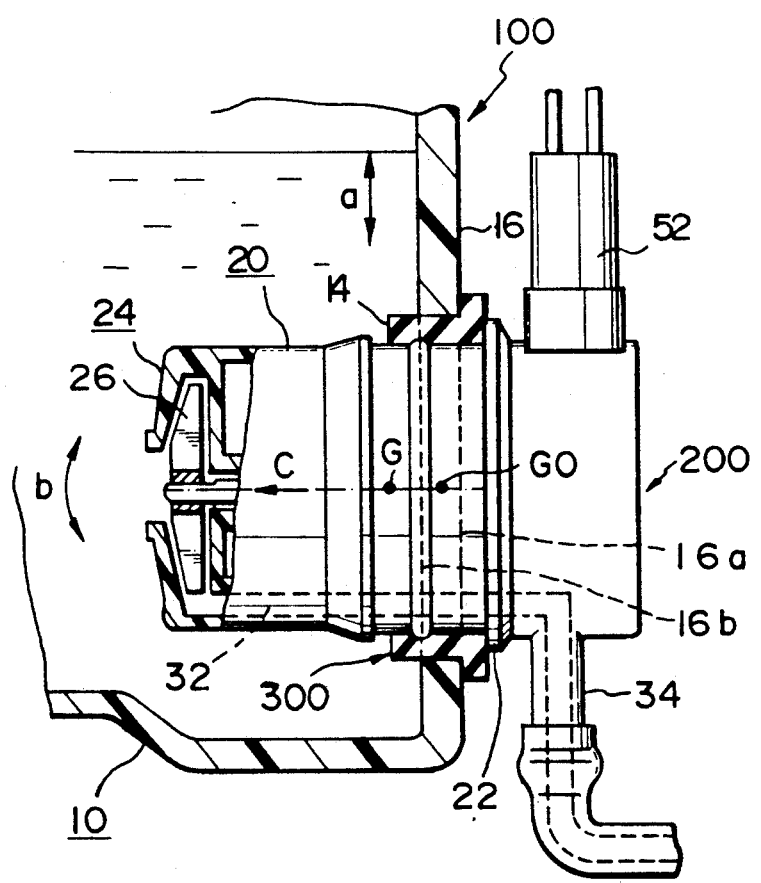
FIG. 5 is a fragmentary cross-section of the second embodiment of a vehicle window washing system constructed in accordance with the present invention.

Referring now to FIG. 5, there is shown the second embodiment of a vehicle window washing system constructed in accordance with the present invention, wherein parts having substantially the same functions as described in the first embodiment are denoted by similar reference numerals and will not be further described herein.

The second embodiment illustrated is characterized by that the washer pump 200 is mounted in the washing liquid tank 100 such that the center of gravity G in the washer pump 200 is located at a position spaced inwardly apart from the outer wall 16a of the tank 100. In such an arrangement, the washer pump 200 can be mounted more stably in the tank 100 in addition to the seven advantages in the first embodiment.

More particularly, the washer pump tends to be oscillated about its mounting point at the tank 100 as shown by an arrow b when such a vibration as shown by an arrow a creates vertically in the tank 100. Since the center of gravity G in the washer pump 200 is located at the position spaced inwardly apart from the outer wall 16 of the tank 100 in accordance with the second embodiment of the present invention, however, an axial component acting on the washer pump 200 will be directed inwardly of the tank 100 as shown by an arrow c in FIG. 5. As a result, the washer pump 200 can be held more reliably in the washing liquid tank 100.

It is more preferable that the center of gravity G0 in the washer pump 200 is located between the outer and inner walls 16a, 16b of the tank 100, that is, within the thickness of the side wall 16 of the tank 100. In such a manner, the vibration created in the washer pump 200 can be minimized such that it will be held more reliably.

Third Embodiment

Figure 6:
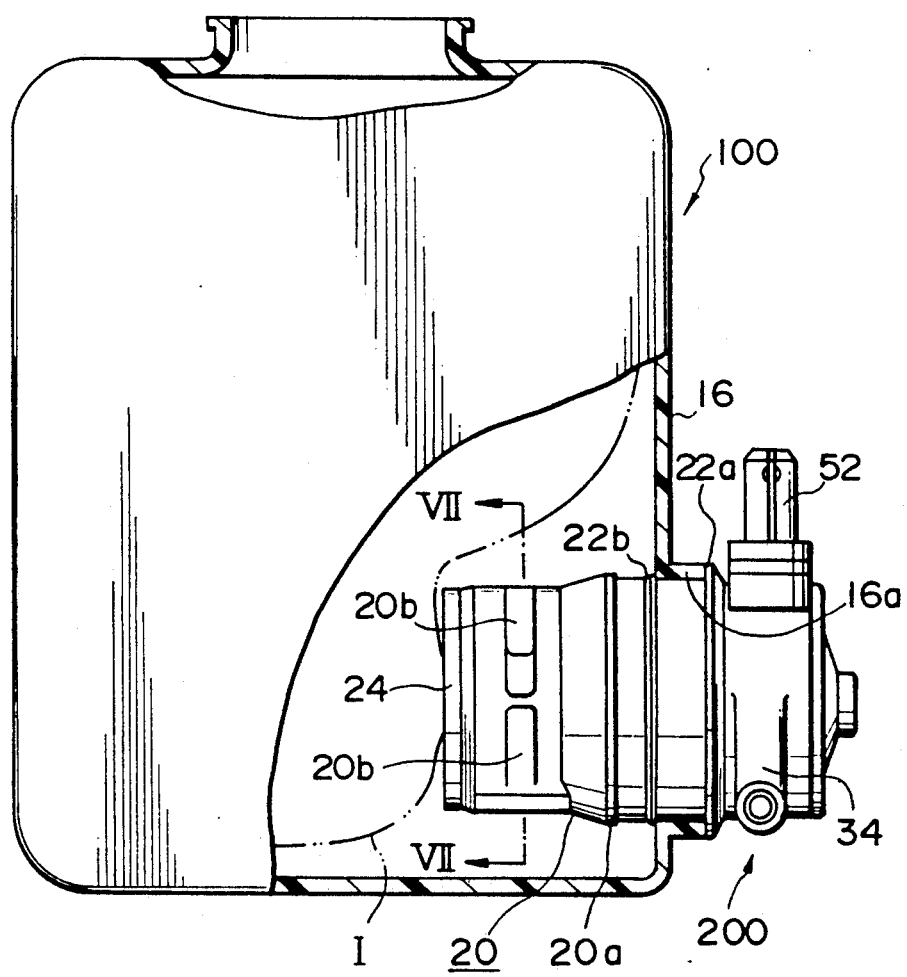
FIG. 6 is a side view, partially broken, of the third embodiment of a vehicle window washing system constructed in accordance with the present invention.
Figure 7:
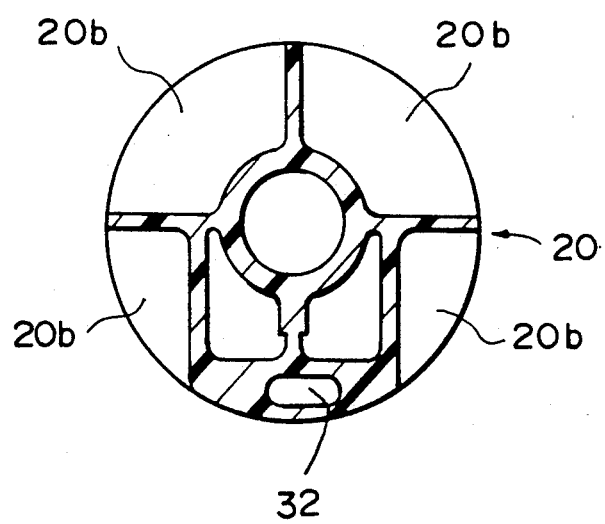
FIG. 7 is a cross-sectional view of the washer pump, taken along a line VII—VII in FIG. 6.

Referring now to FIGS. 6 and 7, there is shown the third embodiment of the present invention wherein parts having substantially the same functions as those of the first embodiment are designated by similar reference numerals and will not be further described herein.

The third embodiment is characterized by that the housing 20 of the washer pump 200 includes a ring-shaped ridge 20a outwardly and circumferentially extending around the outer periphery thereof and a plurality of recesses 20b angularly spaced away from one another around the outer periphery of the housing 20.

The ridge and recesses 20a, 20b function as means for preventing the washer pump 200 from being unintentionally withdrawn out of the tank 100 if the washing liquid therein is frozen to increase the internal pressure in the tank 100. More particularly, the washing liquid is normally frozen gradually from near the side wall of the tank 100 toward the center thereof. Thus, the internal pressure in the tank 100 will be increased gradually as the washing liquid is being frozen. As a result, the washer pump 200 will be urged outwardly and may be fallen off in the worst case. If it is assumed that the washing liquid begins to be frozen around the washer pump 200 as shown by a chain line I in FIG. 6, the frozen liquid portion will effectively engage or bite the ridge 20a and/or recesses 20b on the housing 20 of the washer pump 200. This can reliably prevent the washer pump 200 from being urged outwardly by the internal increased pressure in the tank 100.

Depending on such a purpose that the washer pump 200 is to be held with the desired strength of fixation, one of the ridge and recesses 20a or 20b may be provided on the housing 20 of the washer pump 200. Moreover, the ridge and recesses 20a, 20b may be designed into any desired configuration and arrangement.

Figure 8:
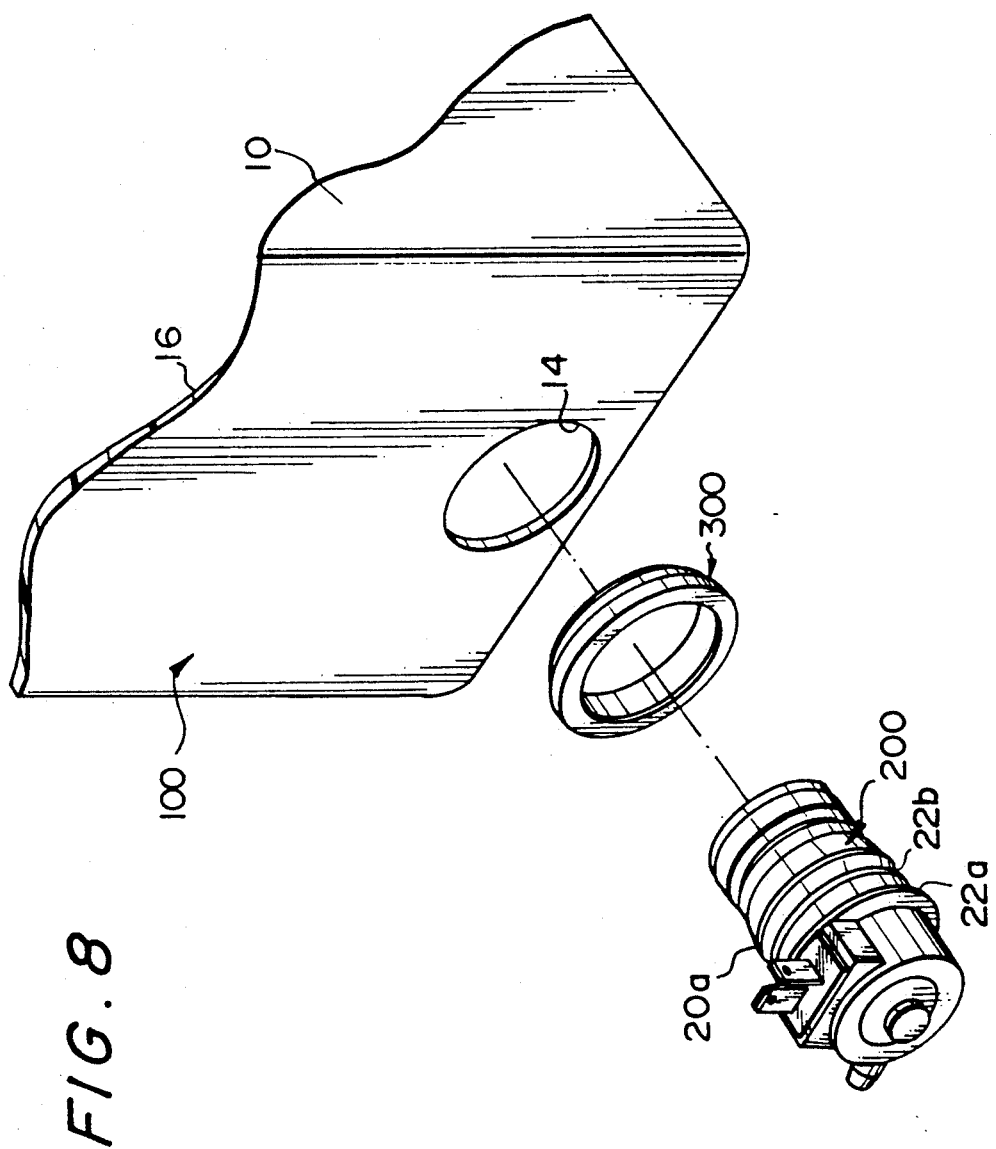
FIG. 8 is a perspective view of part of the washing system, illustrating how to mount the washer pump shown in FIG. 6 on the tank through a grommet.

In the present embodiment, the washer pump 200 is mounted and held on the tank 100 without use of any grommet. More particularly, an opening formed in the side wall 16 of the tank 100 includes a ring-shaped duct portion 16a formed therein to extend outwardly from the outer wall thereof. This duct portion 16a is sandwiched between a pair of longitudinally spaced flanges 22a and 22b to hold the washer pump 200 in place. The washer pump 200 can be of course mounted in the opening of the tank 100 through a grommet. This is shown in FIG. 8.

Although some typical embodiments of the present invention have been described, the present invention is not limited to such embodiments and can be modified and applied in various other configurations and/or arrangements within the scope of the invention claimed. Some modifications of the present invention with respect to the mounting of the washer pump 200 on the tank 100 will be described below. It is, however, to be understood that these modifications possess the basic advantages as in the first embodiment aforementioned.

First Modification

Figure 9:
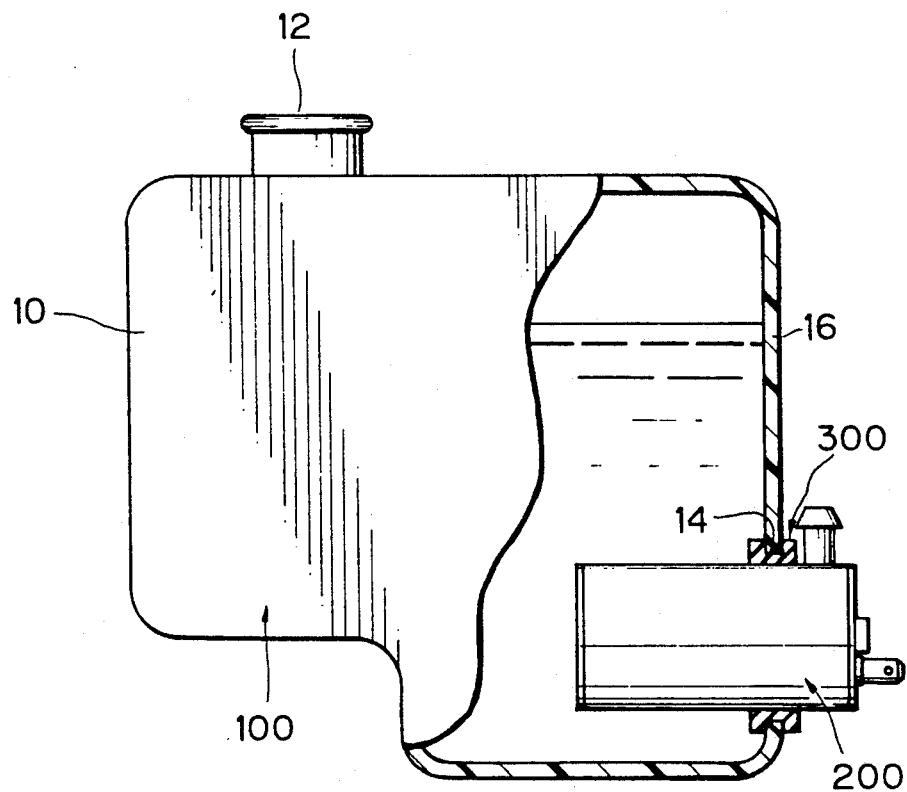
FIG. 9 is a side view, partially broken, of a modification of the vehicle window washing system in which the tank and washer pump are assembled in a different manner.
Figure 10:
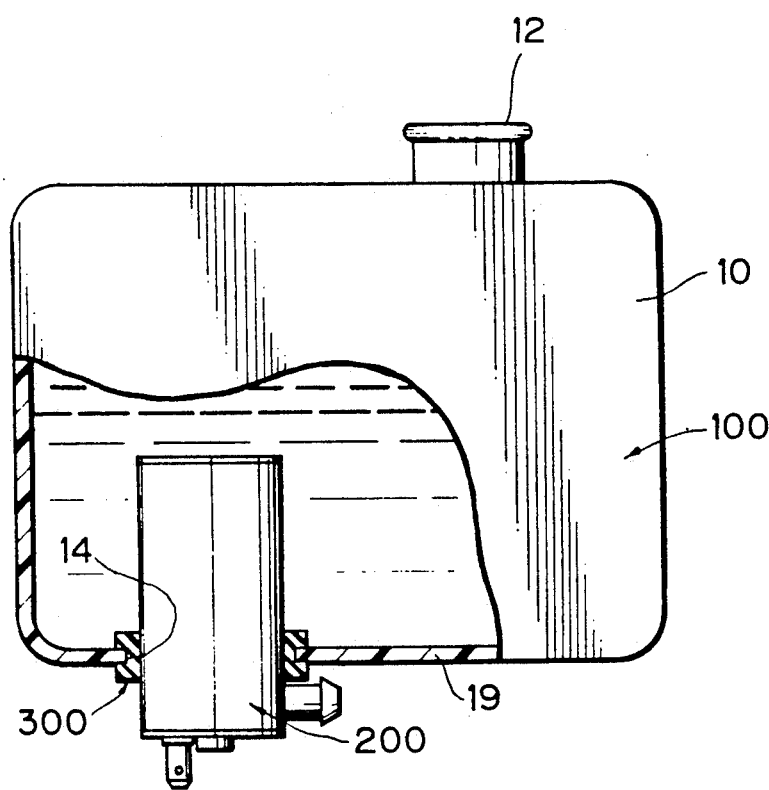
FIG. 10 is a side view, partially broken, of another modification of the vehicle window washing system in which the tank and washer pump are assembled in a different manner.
Figure 11:
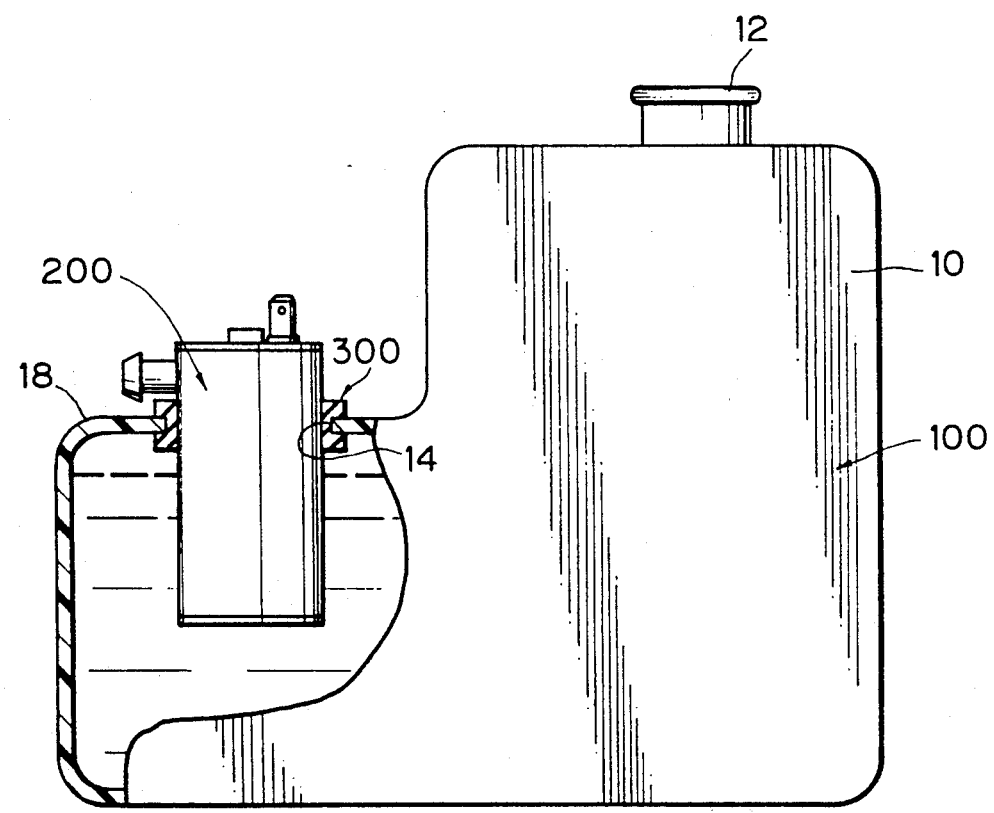
FIG. 11 is a side view, partially broken, of still another modification of the vehicle window washing system in which the tank and washer pump are assembled in a different manner.

FIGS. 9 through 11 illustrate various modifications of the present invention in which the washer pump 200 is mounted in the washing liquid tank 100. It is to be noted herein that the tank 100 may take various configurations depending on the internal configuration of the vehicle body in which the tank 100 is to be mounted and so on. The washer pump 200 may be optionally mounted on the washing liquid tank 100 at any desired location, for example, the side wall 16 as shown in FIG. 9, the bottom wall 19 as shown in FIG. 10 or the top wall 18 as shown in FIG. 11. In short, the position of the washer pump 200 to be mounted may be suitably selected depending on various conditions of space, piping, wiring and so on.

Second Modification

Figure 12:
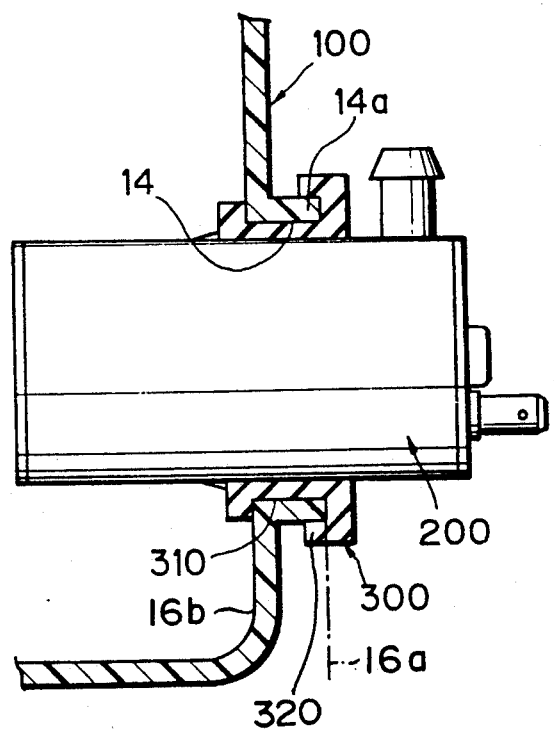
FIG. 12 is a side view, partially broken, of part of the washing system, illustrating a manner that the washer pump is mounted in the opening of the washing liquid tank through a modified grommet.
Figure 13:
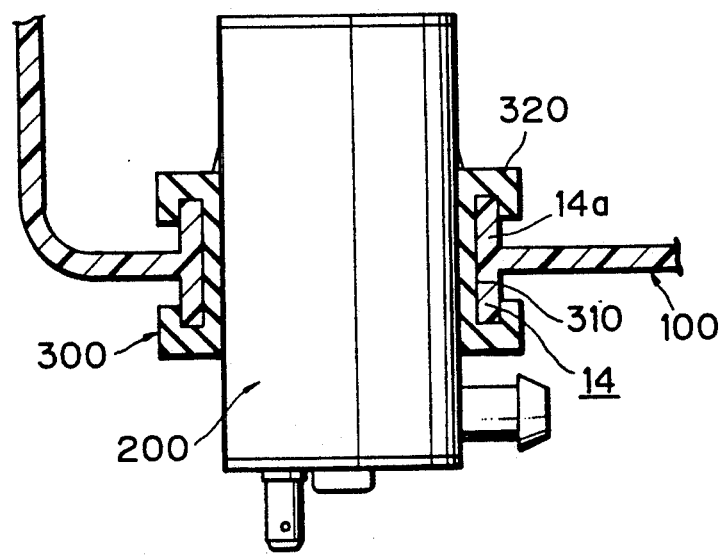
FIG. 13 is a side view, partially broken, of part of the washing system, illustrating a different manner that the washer pump is mounted in the opening of the washing liquid tank through a still modified grommet.

FIGS. 12 and 13 show the second modification of the invention with respect to the configuration of the opening 14 in the tank 100 and the grommet 300.

Referring to FIG. 12, the opening 14 of the tank 100 includes a ring-shaped duct portion 14a. On the other hand, a grommet 300 is in the form of a ring which includes a circumferentially extending groove 310 in which the ring-shaped duct portion 14a engages, and an inwardly extending latch portion 320 engaging the outer edge of the duct portion 14a.

Referring to FIG. 13, the opening 14 of the tank 100 is in the form of a sleeve-shaped duct portion 14a while the grommet 300 has a circumferentially extending groove of C-shaped cross-section as viewed in the radial direction. This groove has a latch portion 320 inwardly extending at each of the inner edges thereof, the latch portions 320 being adapted to engage the end edges of the sleeve-shaped duct portion 14a to hold the washer pump 200 in the opening 14 of the tank 100.

The engagement between the opening 14 of the tank 100 and the grommet 300 will not be limited to any particular configuration and/or arrangement if the washer pump 200 can be reliably mounted and held in the opening 14.

Third Modification

Figure 14:
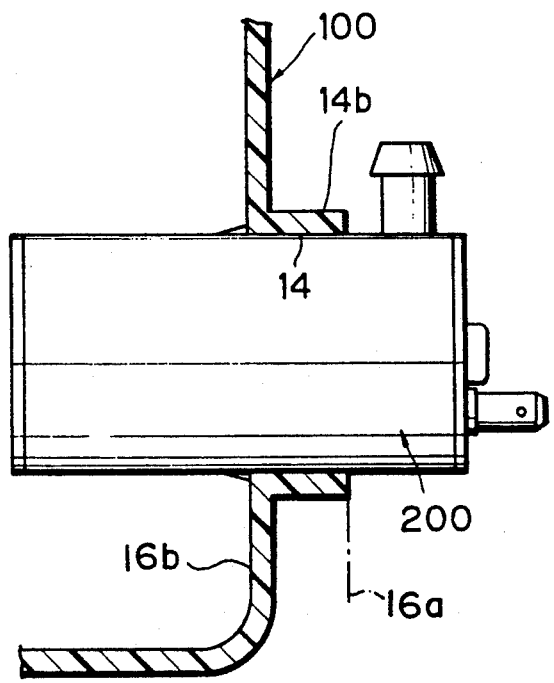
FIG. 14 is a cross-sectional view of the washing liquid tank, illustrating a modification of the opening formed therein, through which the washer pump is mounted.
Figure 15:
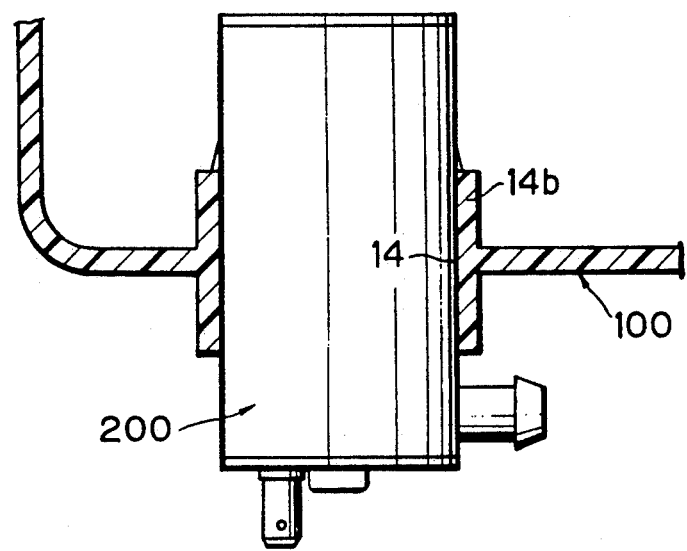
FIG. 15 is a cross-sectional view of the washing liquid tank, illustrating another modification of the opening formed therein, through which the washer pump is mounted.

In the third modification as shown in FIGS. 14 and 15, the washer pump 200 is held in the opening 14 of the washing liquid tank 100 without using any grommet.

The washing liquid tank 100 includes a ring-shaped opening 14 formed therein to extend outwardly from the outer wall thereof. The washer pump 200 is only frictionally held in the opening 14. This requires to make the washing liquid tank 100 from a material having some resiliency, such as elastomeric plastics or rubber material. In such a case, any suitable reinforcing fastener may be preferably mounted around the outer periphery of the opening 14.

In the second and third modifications aforementioned, the ring-shaped or sleeve-shaped opening 14a or 14b in the washing liquid tank 100 can enlarge the area of contact between the opening and the grommet 300 or washer pump 200 and thus more reliably hold the washer pump 200 in the opening of the tank 100.

In the second and third modifications, it is to be noted that the outer end face of the duct portion 14a or 14b at the opening 14 (see FIGS. 12 and 14) is included in the outer wall 16a of the washing liquid tank 100 as defined in the second embodiment. If the opening 14 in the second embodiment takes either of the ring-shaped or sleeve-shaped duct portion 14a or 14b, the optimum area in which the center of gravity in the washer pump 200 is to be located, that is, the dimension between the outer and inner walls 16a, 16b of the washing liquid tank 100 will be substantially enlarged to more facilitate the positioning of the washer pump 200.

Fourth Modification

Figure 16A:
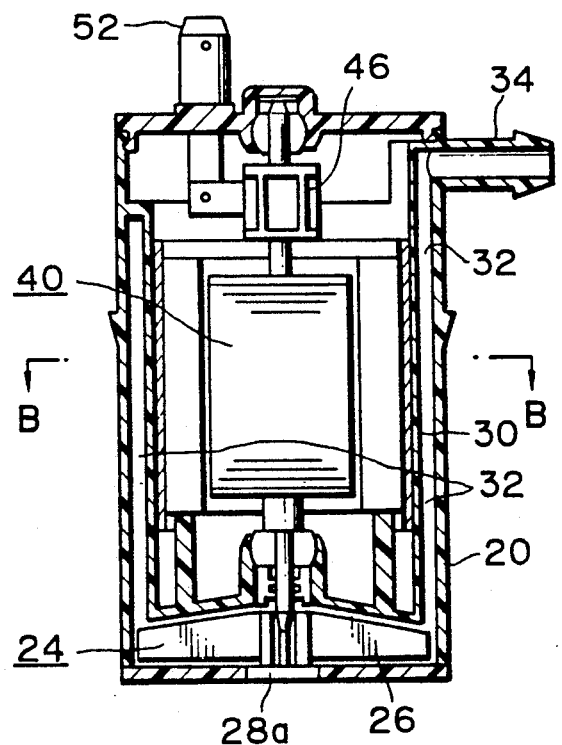
Figure 16B:
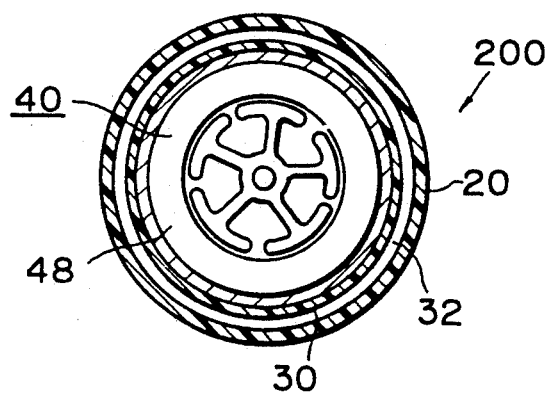
Figure 17A:
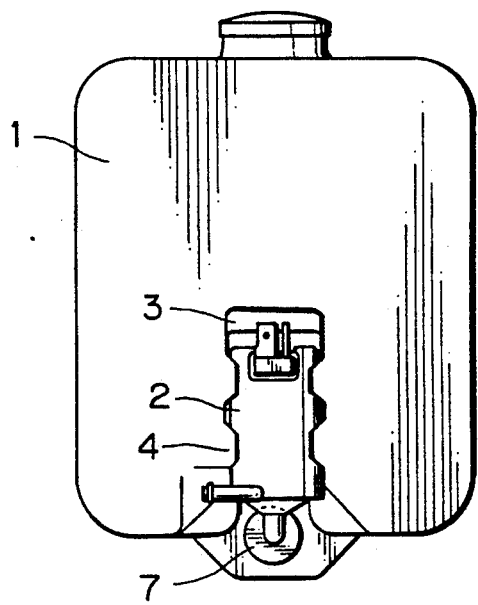
FIG. 17A is a front view of the washing system and FIG. 17B is a side view, partially broken, of the same system.
Figure 17B:
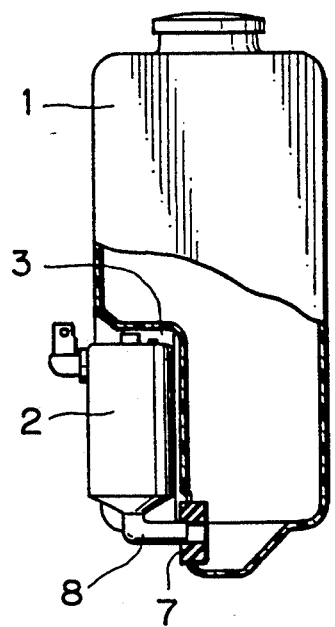
Figure 18:
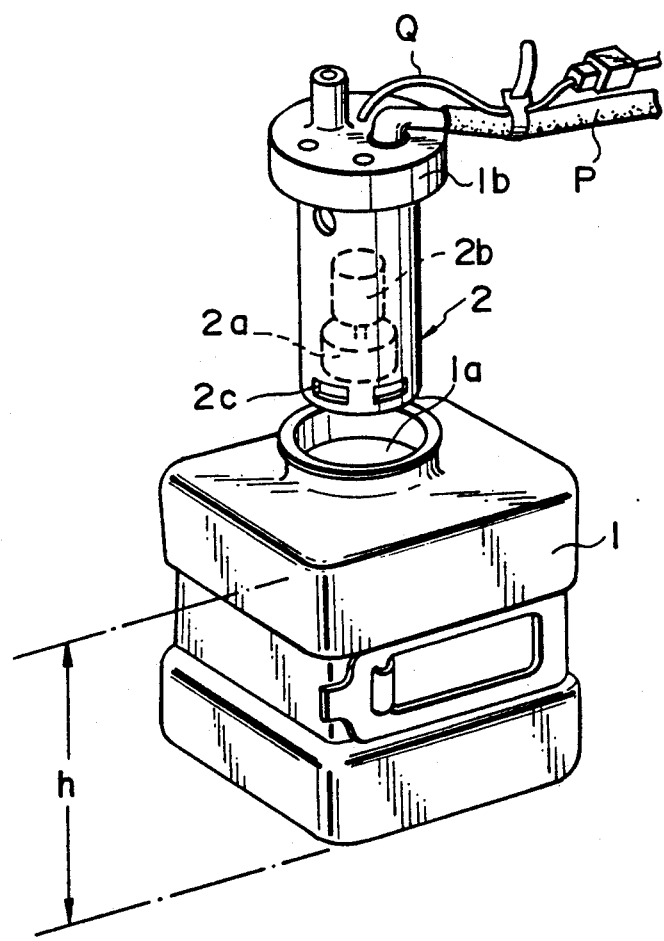
FIG. 18 is a perspective view of another vehicle window washing system constructed in accordance with the prior art.

FIGS. 16A and 16B illustrate the fourth modification of the washer pump 200 wherein parts similar to those of the embodiments shown in FIGS. 2 and 3 are denoted by similar reference numerals and will not be further described herein.

The washer pump 200 comprises a cylindrical housing 20 and a cylindrical partition 30 coaxially disposed within the housing 20 and spaced apart from the inner wall of the housing 20. The inner wall of the housing 20 defines an annular flow passage 32 with the outer wall of the partition 30, the flow passage 32 thus surrounding the entire motor section 40 and extending from the pump section 24 to the outlet 34.

Since the washing liquid flows along and around all the outer wall of the motor section 40, the motor section 40 can be cooled by the washing liquid much more effectively.

In the fourth modification, similarly, the washer pump 200, grommet 300, the tank 100 and the opening 14 in the tank 100 may be designed in various configurations, dimensions and arrangements.

From the foregoing, it will be apparent that the washer pump may be assembled easily and efficiently into any one of various types of washing liquid tanks having different configurations.

It will be further apparent that since most of the washer pump is positioned within the washing liquid in the interior of the tank, any noise due to the vibration created when the motor is actuated may be effectively suppressed with the motor being effectively cooled.

We claim:

1. A vehicle window washing system, comprising: a tank for receiving a washing liquid and having inlet means; and a washer pump mounted in said tank, said tank further having an opening other than said inlet means formed therein at part of one of a lower side wall and a bottom wall thereof, and said washer pump comprises a cylindrical housing, a pump means disposed in said housing and including an inlet port and an impeller, with a motor means also disposed in said housing for rotatably driving said impeller, with outlet means formed in said housing to extend outwardly from an outer wall of said housing, and flow passage means connecting said outlet means with said pump means, whereby at least said pump means and said motor means are inserted into said tank through said opening in one of the lower side wall and the bottom wall and further comprising a watertight support means having elasticity for fixedly holding said washer pump relative to said tank such that said outlet means is positioned outside of said tank.

2. A vehicle window washing system as defined in claim 1, wherein said pump means is located in said housing at one end, said motor means being located in said housing substantially at a central portion thereof, said outlet means being formed in said housing at an opposite end, said motor means being adapted to rotate about the longitudinal axis of said housing.

3. A vehicle window washing system as defined in claim 2, wherein said flow passage means is formed inside of said housing to extend parallel to the longitudinal axis of said housing.

4. A vehicle window washing system as defined in claim 3, wherein said housing includes a cylindrical yoke formed therein for reinforcing said housing.

5. A vehicle window washing system as defined in claim 4, wherein said washer pump is fixedly held in said opening of said tank through an elastomeric grommet.

6. A vehicle window washing system as defined in claim 2, wherein said flow passage means is formed to surround the outer periphery of said motor means.

7. A vehicle window washing system as defined in claim 1, wherein said washer pump is positioned such that the center of gravity thereof is located at a position spaced inwardly apart from the outer wall of said tank.

8. A vehicle window washing system as defined in claim 7, wherein said washer pump is positioned such that the center of gravity thereof is located between the inner and outer walls of said tank.

9. A vehicle window washing system as defined in claim 1, wherein said washer pump is fixedly held in the opening of said tank through an elastomeric grommet.

10. A vehicle window washing system as defined in claim 1, wherein said washer pump is fitted inside and held within an annular duct portion which is formed at said opening to extend outwardly from the outer wall of said housing.

11. A vehicle window washing system as defined in claim 10, wherein said washer pump is fixedly held between the outer wall of said housing and said annular duct portion through an elastomeric grommet.

12. A vehicle window washing system as defined in claim 10, wherein said washer pump is positioned such that the center of gravity thereof is located within the range of length of said annular duct portion.

13. A vehicle window washing system as defined in claim 1, wherein said housing may include at least one ridge and at least one recess formed therein at the outer wall of said housing located inside of said tank.

14. A vehicle window washing system as defined in claim 13, wherein said washer pump is fixedly held in the opening of said tank through an elastomeric grommet.

15. A vehicle window washing system as defined in claim 13, wherein said washer pump is fitted inside and held within an annular duct portion which is formed at said opening to extend outwardly from the outer wall of said housing.

16. A vehicle window washing system as defined in claim 15, wherein said washer pump is fixedly held between the outer wall of said housing and said annular duct portion through an elastomeric grommet.

* * * * *